United States Patent [19]

Tochor

[11] Patent Number: 5,193,469

[45] Date of Patent: Mar. 16, 1993

[54] VARIABLE RATE FERTILIZER CONTROLLER

[76] Inventor: Brian E. Tochor, Box 128, Yarbo, Saskatchewan, Canada, S0A 4V0

[21] Appl. No.: 846,283

[22] Filed: Mar. 2, 1992

[51] Int. Cl.$^5$ ............................................. A01C 23/00
[52] U.S. Cl. ................................ 111/118; 111/200; 116/277; 251/294; 137/553; 239/73
[58] Field of Search ............... 111/118, 119, 120, 200, 111/925, 926; 172/430; 116/277, 284, DIG. 21; 251/129.11, 294; 137/553, 556.3; 239/71, 73

[56] References Cited

U.S. PATENT DOCUMENTS

| | | | |
|---|---|---|---|
| 2,582,556 | 1/1952 | Morey | 137/553 X |
| 2,768,604 | 10/1956 | Enerud | 116/277 |
| 2,930,344 | 3/1960 | Brased | 116/277 |
| 3,203,266 | 8/1965 | Willis et al. | 137/553 X |
| 4,062,306 | 12/1977 | Wosmek | 111/119 |
| 4,193,356 | 3/1980 | Vehe et al. | 111/6 |
| 4,458,609 | 7/1984 | Tofte | 111/119 |
| 4,530,463 | 7/1985 | Hiniker et al. | 239/71 |
| 5,033,397 | 7/1991 | Colburn, Jr. | 111/118 |

FOREIGN PATENT DOCUMENTS 1178852 12/1984 Canada .

Primary Examiner—Dennis L. Taylor
Assistant Examiner—Jeffrey L. Thompson

[57] ABSTRACT

A variable rate "on the go" fertilizer application controller for use with an agricultural earth working implement comprising a controlled metering device mounted on the implement. The control includes a reversible motor that operates a valve in the meter and at the same time a power take-off from the valve actuator drive operates a calibrated dial indicator to be interpreted by an operator so that action may be taken by a remote control device to make adjustments to compensate for variable soil conditions to get optimum crop production.

20 Claims, 4 Drawing Sheets

VARIABLE RATE FERTILIZER CONTROLLER

The instant invention deals with the application of fertilizers to the soil and, more particularly, to "on the go" controlled variation in the rate of fertilizer applied to the soil.

BACKGROUND OF THE INVENTION

The modern farm practice of applying chemicals to the soil to obtain an optimal crop yield has been used for many many years. The farmer, as always, desires sufficient soil fertility to ensure that a successful harvest will result from his planting. Cropland productivity is increased considerably with the application of specific chemicals such as nitrogen, phosphorous and potassium. These fertilizers are applied by diverse types of field equipment and a decision must be made as when to apply, how much to apply, the nutrient requirements of the particular plants he wants to grow, the field conditions and climatic conditions. In the case of nitrogen, local field conditions determine the quantity of ammonium held, on the exchange complex of the soil, and the precise mechanics of conversion to more available forms via bacterial reaction. After the transformation of ammonium by soil bacteria to nitrate it becomes very mobile due to its solubility with soil water and therefore the topography of the land can be very important. To address the problem of these varying levels of the nitrogen requirement a producer will normally have representative soil samples taken from a field, have them tested and determine how much fertilizer is required to bring the field to a desired level. In most cases it is found that the low areas have a high residual count, the midslopes a medium count and the higher areas a low count. In view of the high cost of time and fertilizer and the fact that there is a drastic diminishing yield response after a certain level of fertilizer application, the producer must act accordingly.

In order to alleviate the above mentioned problem of waste of time and money, attempts have been made for optimum production. The three most closely related patents known to applicant are U.S. Pat. Nos. 5,033,397, 4,193,356 and Canadian patent 1,178,852.

The U.S. Pat. No "397" teaches a plurality of ground-engaging tools in association with individual soil sensors which measure soil chemical levels. The appropriate concentration is found and an automatic servo-controlled delivery system applies the appropriate amount of fertilizer, substantially in the location from which the soil measurements were taken. While this solution to the problem appears to be desirable the cost for the average producer would be prohibitive. Applicants device also provides an "on the go" method of a variable application of fertilizer with the operator varying the rate according to prior laboratory tests taken at various location in the field.

The U.S. Pat. No. "356" teaches a monitoring of a decrease of the amount of a fluid being applied to the soil by a nozzle malfunction and really has nothing to do with a controlled increase or decrease of the total quantity of fluid applied.

The Canadian patent "852" deals with controlled experiments where the composition of the mixture can be controlled and where the outflow to each nozzle is controlled. The control of the mix being possibly adjusted by remote control from the drivers cabin. Applicants invention is directed to a remotely controlled metering device which is controlled "on the go" by the operator who interprets a calibrated read out of the quantity of fertilizer being applied to the soil.

In summary applicant has provided a device for a practical, efficient and economical "on the go" multirange application of a fluid fertilizer to the soil for optimum crop production.

SUMMARY OF THE INVENTION

Soil sampling is done to determine the fertilizer requirement for particular areas of a field. With an indication of the residual nutrients and an estimate of the required level of fertilization one can deduce what amounts should be placed where in that field. To vary the application of the fertilizer "on the go" is undoubtedly a necessity as far as economics is concerned since one does not want to over fertilize in one area and under fertilize in another. To vary the application "on the go" a controlled metering device is mounted on an agricultural earth working implement that enables application of the fertilizer to the soil. The control of the metering device is by a reversible electric motor that operates a valve in the meter and at the same time by means of a power take-off drive from the valve actuator drive operates a calibrated indicating means to be interpreted by an operator so that action may be taken by means of a remote control device to make adjustments to compensate for the above noted variances in the field to get optimum crop production.

In view of the above summary it is readily discernable that the primary object of the above invention is the maximization of production with a minimum of cost by avoiding the conventional approach of applying high uniformly applied fertilizer levels.

A further object of the instant invention is to provide a readily visible calibrated indicating means.

It is another object of the instant invention to be able to increase or decrease the rate of application of a fluid fertilizer "on the go".

It is yet another object of the invention to provide a controlled metering device that is easy to manufacture, to install and to maintain.

It is a further object of the invention to remotely control the rate of application of the fertilizer after an interpretation of the required rate has been made.

These and other objects of the present invention will become readily apparent as the following description is read in conjunction with the accompanying drawings wherein like reference numerals indicate like elements throughout the several views.

DETAILED DESCRIPTION OF INVENTION

Figure 1:
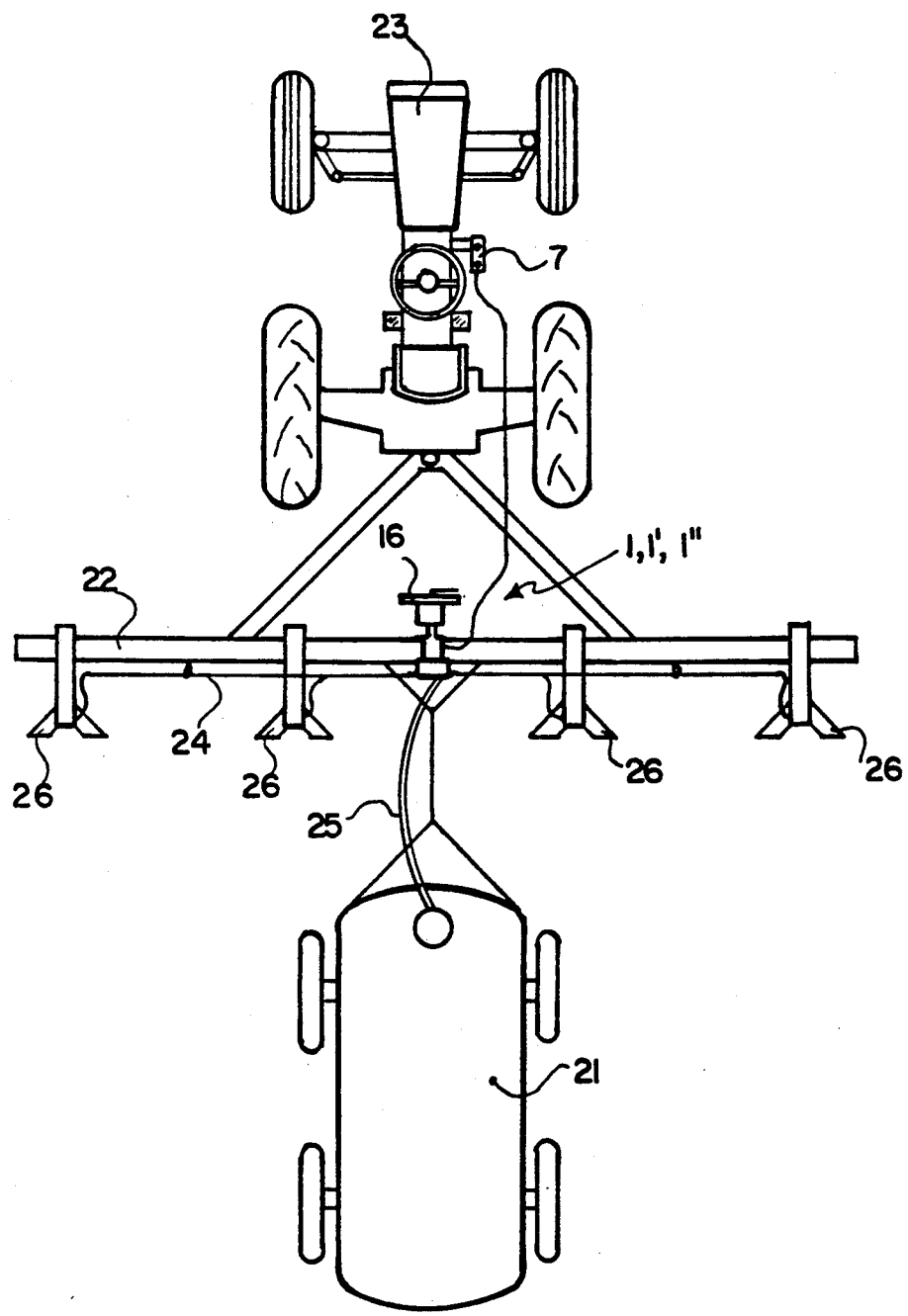
FIG. 1 is a schematic plan view of a fertilizer system utilizing applicants instant invention.

Referring to FIG. 1 of the drawings a traction device 23 is shown pulling an earth working implement 22 which carries one of the "on the go" variable rate indication fertilizer controllers 1 or 1' or 1". The controller 1 or 1' or 1" supplies the fertilizer to the earth working tools by a distribution system 24 carrying the fertilizer to the tools 26. The supply or source of the fertilizer is contained in a supply tank 21 towed by the earth working implement 22. The controller 1 or 1' or 1" may be powered by a conventional 12 volt battery in the traction device 23, the power being controlled by a reversing switch 7 mounted within reach of the operator on the traction device 23.

Figure 2:
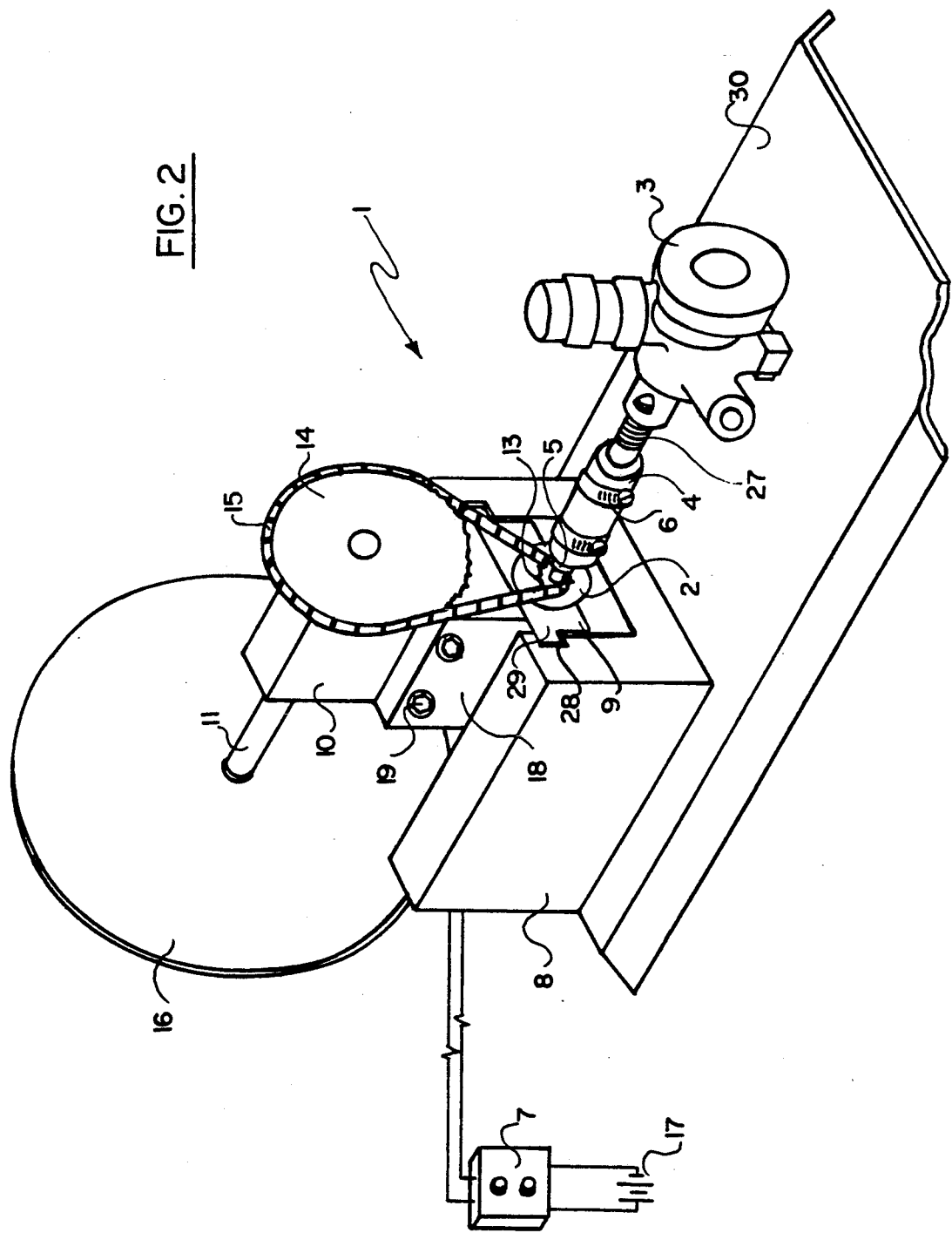
FIG. 2 is an isometric view of the first embodiment of applicants invention.
Figure 5:
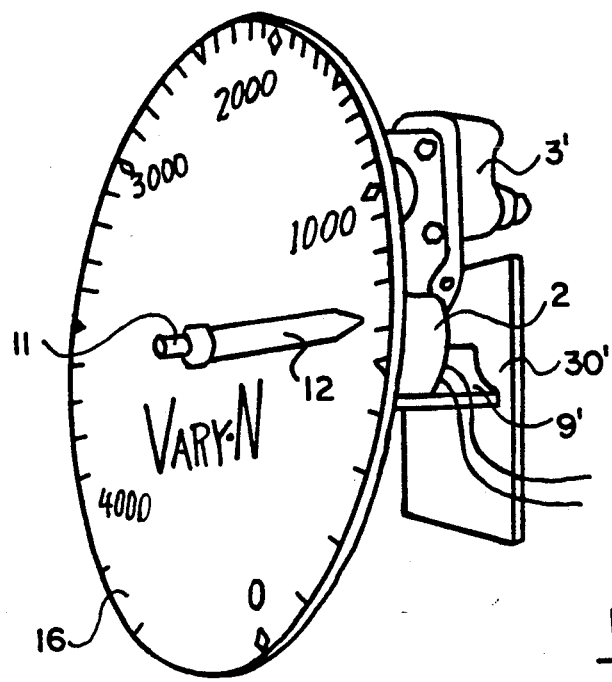
FIG. 5 is a perspective view of the calibrated dial face.

Referring now to FIG. 2 there is illustrated the variable rate indicating controller 1 which is supported on the earth working implement 22 by a fluid meter support 30. A calibrated dial face 16, the front face of which is more clearly shown in FIG. 5, is fixed to a drive motor support 8. The reversible drive motor 2 is slidably mounted to fluid meter support 30 through the drive motor mounting 9 and drive motor support 8. The drive motor mounting 9 has a has a drive motor support groove 28. The drive motor 2 with drive motor mounting tongue 29 and the drive motor eccentric output shaft is connected to an adapter 5 which is coupled to the metering shaft 27 through a resilient coupling 4 which is held in position by two adjustable coupling clamps 6. The drive motor 2 is energized by a reversing switch 7 powered by the battery 17 of the traction device 23. The reversing switch 7 reverses the direction of drive motor 2, the direction of rotation depending on which button of the reversing switch 7 has been pressed. The reversing of the drive motor 2 either increases or decreases the quantity of fertilizer being applied. It is the threads on the metering shaft 27 that require the motor to be slideably mounted when there is an increase or decrease of flow. On the drive motor mounting 9 is mounted an indicator shaft support mounting 18 which carries adjusting screws 19 to adjust the height of indicator shaft support 10 which rotatably mounts the indicator shaft 11. The indicator shaft 11 is driven by a power take-off from the output shaft of the reversible drive motor 2 or from the adapter 5 which is connected to the output shaft whichever is most convenient. The power take-off is in the form of a driving sprocket, gear or pulley 13 connected by a flexible drive member 15 which can be in the form of a chain or belt, that drives a driven sprocket gear or pulley 14 which is attached to the indicator shaft 11. The indicator shaft 11 has of course an indicator arm 12 attached thereto as shown more clearly in FIG. 5 to give a read-out as to the quantity of fertilizer being applied.

Figure 3:
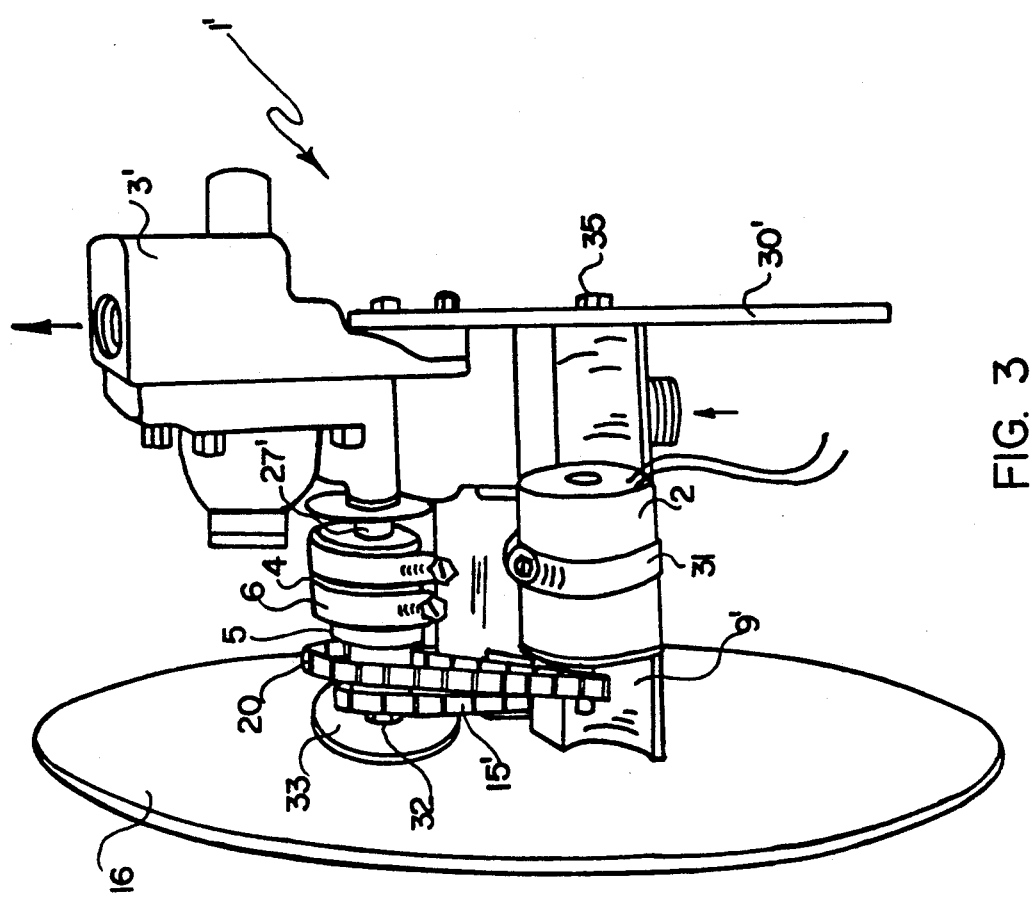
FIG. 3 is a side elevation of a second embodiment of applicants invention.

For a different type of meter 3' as shown in FIG. 3 there is illustrated a slightly different arrangement but with the principles of operation remaining the same. The fluid meter 3' is attached to a fluid meter support 30' which is of course mounted on the earth working implement 22. To the fluid meter support 30' is connected a drive motor mounting 9'. A drive motor 2 with eccentric output shaft is mounted on the drive motor mounting 9'. The calibrated dial face 16 is fixed to the drive motor mounting 9' and carries with it a power take-off shaft bearing support 33. The drive motor 2 is connected to an adapter 5 which is coupled to a metering shaft 27' through a resilient coupling 4. The connection of the drive motor 2 to the adapter 5 is in this embodiment by means of a sprocket, gear or pulley 34 attached to the drive motor 2 output shaft and a sprocket, gear or pulley 35 attached to the adapter 5 and being driven by means of a driving flexible member 20 more clearly illustrated in FIG. 4. The power take-off shaft 32 is connected to the adapter 5 and drives the power take-off driving sprocket, gear or pulley 13' which drives the power take-off driven sprocket, gear or pulley 14' by means of the flexible power take-off drive member 15' which may of course be a chain or belt. The power take-off sprocket, gear or pulley 14' drives the indicator shaft 11 connected to the indicating arm 12 shown in FIG. 4.

Figure 4:
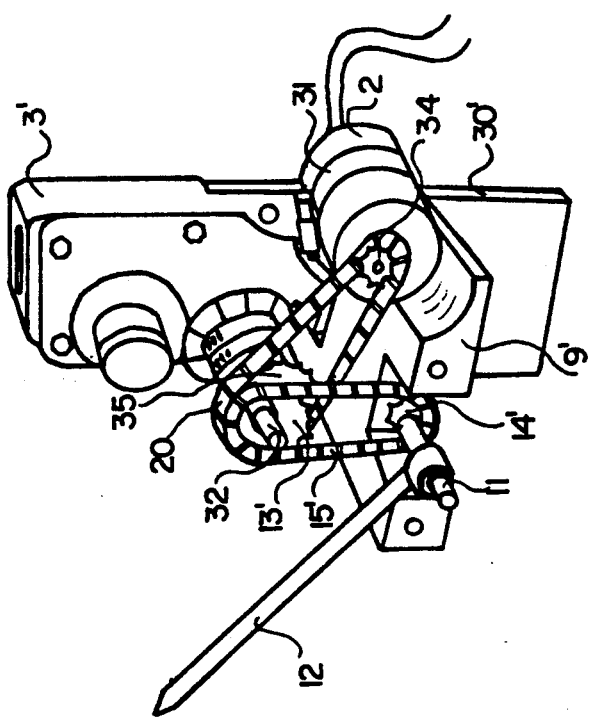
FIG. 4 is a perspective partial view of the second embodiment of applicants invention.

Referring now to FIG. 4 there is illustrated the same variable rate indicating controller as shown in FIG. 3 with the calibrated dial face 16 with power take-off shaft bearing support 33 removed from the end of drive motor mounting 9'. The indicating arm 12 having been removed and replaced when the calibrated dial face 16 was removed.

Referring to FIG. 5 there is illustrated the same variable rate indicating controller as shown in FIG. 3 but more clearly showing the calibrated dial face 16 with indicator shaft 11 and mounted indicator arm 12. This dial indicating assembly is the same for all of the embodiments.

Figure 6:
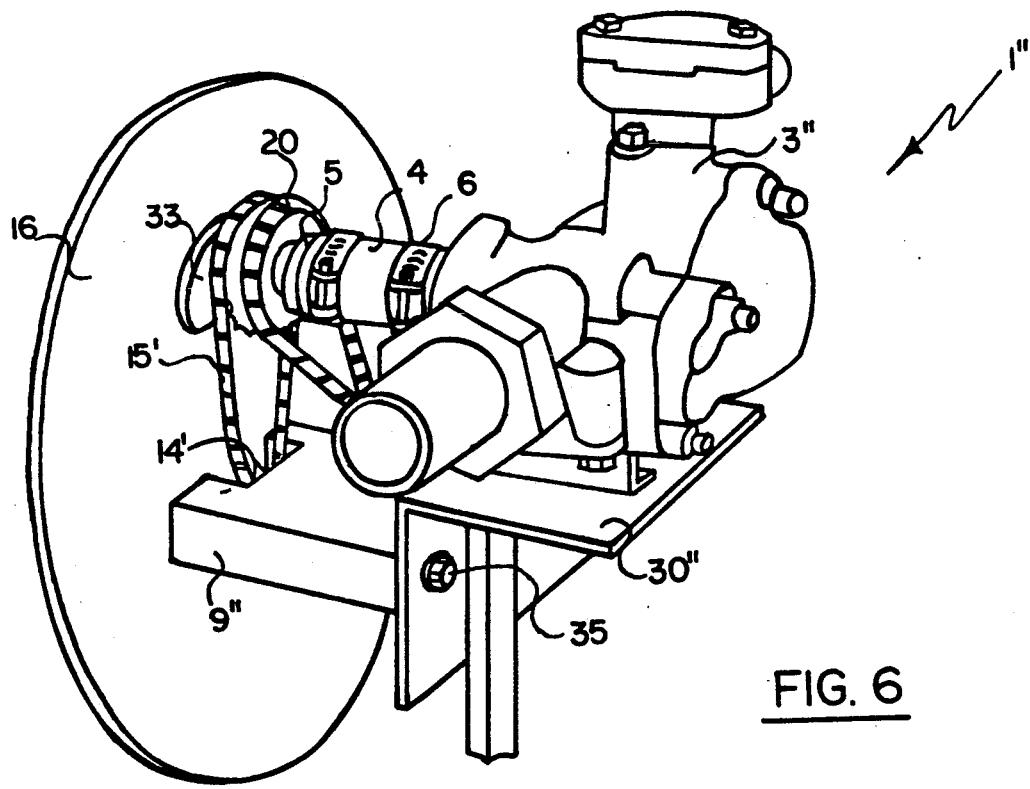
FIG. 6 is a perspective view of the third embodiment of applicants invention.

Looking now at the third embodiment illustrated in FIG. 6 there is shown the same drive assembly and power take-off assembly as in FIG. 3 but with the drive motor mounting 9" having the drive motor 2 mounted on the opposite side. The fluid meter 3" requires a different fluid meter support 30" formed of an angle iron, but the principles of operation of the variable rate indicating controller remain the same.

For operational flexible power take-off drive adjustment in FIG. 2 it is required only that the adjusting screws 19 be loosened and that the indicator shaft support 10 be raised or lowered for proper tension in the flexible power take-off drive member 15 and then the adjusting screws 19 be retightened.

For operational flexible driving member 20 adjustment and flexible power take-off drive member 15 adjustment in FIGS. 3 and 6 the mounting adjustment bolts 35 holding the drive motor mounting 9' or 9" are loosened, the motor mounting 9' or 9" raised or lowered as required and the adjustment bolts 35 retightened. The drive motor mounting clamp 31 is now loosened, the drive motor 2 with its eccentric output shaft is then rotated to tighten driving flexible member 20 and the clamp 31 is retightened.

It is to be understood that "soil" and "earth" are considered synonymous throughout the claims and disclosure.

Various modifications such as size, shape and arrangement of components may be made without departing from the spirit and scope of this invention. The accompanying specification shall be interpreted as illustrative only and limited only by the scope of the invention as defined in the following claims.

What I claim is:

1. The combination with a fertilizer system provided with an earth working implement having earth working tools and drawn by a traction device and trailing a fluid supply therebehind of an "on the go" variable fluid metering device comprising in combination, a fluid motor support mounted on said earth working implement, a drive motor support mounted on said fluid meter support, a drive motor slidably mounted on said drive motor support, fluid metering means mounted on said fluid meter support to control the quantity of fluid flowing from said fluid supply to said earth working tools, connector means connecting said drive motor to said fluid metering means, control means supplying motive energy to said drive motor, an adjustable shaft support mounted on said slidably mounted drive motor, an indicator shaft rotatably supported in said adjustable shaft support, indicator shaft drive means connecting said drive motor to said indicator shaft, a calibrated dial face mounted on said drive motor support, said indicator shaft passing freely through said calibrated dial face and having an arm attached thereto to indicate on the dial a quantitative fluid flow through said fluid metering means, whereby an adjustment of said control means provides a corresponding visual reading on said calibrated dial face to be interpreted by an operator of said fertilizer system.

2. The combination as claimed in claim 1 wherein said drive motor is a reversible electric motor.

3. The combination as claimed in claim 2 wherein said connector means includes a drive motor adapter driving a flexible coupling member.

4. The combination as claimed in claim 3 wherein said control means is an electric switch supplying electromotive energy to said reversible electric motor.

5. The combination as claimed in claim 4 wherein said indicator shaft drive means is a sprocket and chain drive.

6. The combination as claimed in claim 5 wherein said adjustable shaft support is adjustable vertically for chain tightening.

7. The combination as claimed in claim 6 wherein said drive motor slidable mounting is a tongue engaging a groove in said drive motor support.

8. A variable rate fluid controller for use with an agricultural soil working implement for applying fertilizer to the soil comprising in combination, a fluid meter, a fluid meter supporting means for mounting said fluid meter on said soil working implement, motor supporting means on said fluid meter supporting means, valve means included in said fluid meter to increase or decrease the output thereof, a reversible motor means mounted on said motor supporting means, remote control means to selectively rotate said reversible motor in either direction of rotation to operate said valve means, connector means connecting said reversible motor means to said valve means for operation thereof, power take-off means receiving power from said connector means, indicating means operated by said power take-off means and calibrated to indicate the amount of fertilizer being applied to the soil.

9. A variable rate fluid controller as claimed in claim 8 wherein said indicating means includes an indicator shaft adjustably mounted on said motor supporting means and having a proximal end thereof connected to said power take-off means, a calibrated dial face mounted on said motor supporting means, an aperture in said calibrated dial face receiving said indicator shaft therethrough, said indicator shaft having mounted on a distal end thereof an indicating arm for giving a readout on said calibrated dial face.

10. A variable rate fluid controller as claimed in claim 9 wherein said connector means includes a motor adapter fastened to said reversible motor and connected in series with a flexible coupling fastened to said valve means.

11. A variable rate fluid controller as claimed in claim 10 wherein said power take-off means includes a driving wheel mounted on said motor adapter, a driven wheel mounted on said proximal end of said indicator shaft and a flexible load transmitting member connecting said driving wheel and said driven wheel.

12. A variable rate fluid controller as claimed in claim 11 wherein said remote control means is fed by a 12 volt power source.

13. A variable rate fluid controller as claimed in claim 8 wherein said indicating means includes a centrally apertured calibrated dial face mounted on said motor supporting means, an indicator shaft rotatably mounted in said motor supporting means and extending through said central aperture, an indicating arm attached to said indicator shaft to give a reading on said centrally apertured calibrated dial face.

14. A variable rate fluid controller as claimed in claim 13 wherein said connector means includes a first flexible load transmitting member driven by said reversible motor, and a flexible coupling connected in series with said first flexible load transmitting member.

15. A variable rate fluid controller as claimed in claim 14 wherein said power take-off means includes a power take-off shaft driven by said connector means and having an end rotatably supported to said centrally apertured calibrated dial face at a location spaced from the central aperture, said power take-off shaft driving a second flexible load transmitting member which in turn is connected to and drives said indicator shaft.

16. A variable rate fluid controller as claimed in claim 15 wherein said motor supporting means is adjustably mounted on said meter supporting means and said reversible motor is rotatably adjustable on said motor supporting means.

17. A variable rate fluid controller as claimed in claim 8 wherein said connector means includes, a driving wheel attached to said reversible motor means, a driven wheel, a first flexible load transmitting member connecting said driving wheel and said driven wheel, a flexible coupling connected to said valve means and an adapter connecting said driven wheel to said flexible coupling.

18. A variable rate fluid controller as claimed in claim 17 wherein said power take-off receives power from said adapter of said connector means.

19. A variable rate fluid controller as claimed in claim 18 wherein said fluid meter supporting means is a two legged angle iron, a first leg supporting said meter, a second leg adjustably supporting said motor supporting means.

20. A variable rate fluid controller as claimed in claim 19 wherein said remote control means includes a 12 volt battery power source, a reversing switch and electrical conduits connecting said 12 volt battery power source, said reversing switch and said reversible motor means in series.

* * * * *